United States Patent [19]
Prampart

[11] 3,788,768
[45] Jan. 29, 1974

[54] FACILITY FOR CONTROLLING THE ORIENTATION OF VARIABLE-PITCH SCREW BLADES

[75] Inventor: Joseph Prampart, Nantes, France

[73] Assignees: Societe Financiere Et Industrielle Des Ateliers Et Chantiers De Bretagne; Prairie au Duc, Nantes Laire Atlantique, France

[22] Filed: Mar. 24, 1972

[21] Appl. No.: 237,640

[30] Foreign Application Priority Data
Sept. 17, 1971 France .............................. 7133561

[52] U.S. Cl. .............................................. 416/157
[51] Int. Cl. ............................................. B63h 1/06
[58] Field of Search .................... 416/157; 91/411 A

[56] References Cited
UNITED STATES PATENTS

| | | | |
|---|---|---|---|
| 2,355,039 | 8/1944 | Eves.................................... | 416/157 |
| 2,484,603 | 10/1949 | Audemar et al................. | 416/156 X |
| 3,018,762 | 1/1962 | Korb............................. | 91/411 A X |
| 3,170,379 | 2/1965 | Dempster........................ | 91/411 A |
| 3,240,275 | 3/1966 | Bennett........................... | 416/157 X |
| 3,261,406 | 7/1966 | Goodman et al. ............... | 416/157 X |

FOREIGN PATENTS OR APPLICATIONS
283,406  1/1965  Netherlands........................ 416/157

*Primary Examiner*—Everette A. Powell, Jr.
*Attorney, Agent, or Firm*—Richard K. Stevens et al.

[57] ABSTRACT

A device for orienting the blades of a variable pitch screw comprises a double acting actuator which produces a greater force in one sense than the other.

4 Claims, 4 Drawing Figures

FACILITY FOR CONTROLLING THE ORIENTATION OF VARIABLE-PITCH SCREW BLADES

This invention relates to devices, such as variable-pitch screws, whose pitch can be continuously modified in operation so that the device operates with optimum characteristics in a variety of conditions.

In high-power orientable-blade screws for ships, the blades are usually rotated by a hydraulic reciprocating actuator whose movement is converted into a rotation. The force of the actuator is applied to a wrist pin which is eccentric with respect to the axis of blade rotation and rigidly secured to the blade either by way of a rod or by way of a slide block or the like sliding in a groove. The usual practice is for a single actuator to service all the blades of the screw, in which event the actuator longitudinal axis coincides with the screw-shaft axis. As a rule, the actuator is disposed in the screw hub.

Blade pitch control facilities fall into two groups : a first group, in which the actuator acts on a single eccentric wrist pin per blade, so that the moment of rotation produces a force which is parallel to the shaft line axis and which must be balanced by the screw hub, and a second group, in which the actuator acts on two diametrically opposite wrist pins on each blade, so that a torque is produced and there is no axial reaction.

In the first group the actuator can take the form either of a stationary cylinder and moving piston, the piston rod being responsible for blade rotation, or of a stationary piston and moving cylinder, the piston being rigidly secured to the hub and therefore stationary, so that the cylinder is the moving member and transmits its motion to the blades. Two double-acting actuators can be used for the second group, the cylinders being stationary and the pistons moving, each piston acting on one of the two wrist pins of the blade. The actuators are disposed on either side of the axis of blade rotation. A facility in which the piston and cylinder both move can be used, the piston and cylinder moving simultaneously and transmitting their movement to each of two diametrically opposite pins on the same blade. In this case the actuator is usually disposed behind the axis of blade rotation.

In all installations having variable-pitch devices, whether they are used as prime movers or for power production as with rotor turbines, size is a vital consideration. As regards inter alia ships, shipbuilders want the length to be comparable to the length of fixed-pitch screws. On the other hand, maximum screw diameter is limited by the ship's draft, and for reasons of efficiency the ratio of hub diameter to screw diameter should be very low — i.e., hub diameter must be very small.

In the known facilities hereinbefore outlined, the cross-section of the pressure chamber responsible for moving the screw blades in the direction corresponding to a changeover from travel astern to travel ahead is almost the same as the cross-section of the chamber responsible for changing the screw is the other direction - i.e., from travel ahead to travel astern. It has been found by experience that the force needed to pivot a screw blade is greatest when the blade moves from its "astern" position to its "ahead" position. The force required for changing over from "ahead" to "astern" is much less. Clearly, therefore, the facilities hereinbefore outlined, in which the cross-sections for both changeovers are virtually the same, provide more force than is need to shift the blades from "ahead" to "astern", and so the space available to receive the actuator is not used satisfactorily.

It is a main object of this invention to use the available space very efficiently by providing an appreciably greater total piston area for the changeover from "astern" to "ahead" than for the changeover from "ahead" to "astern".

To this end, according to the invention, the actuator comprises three pressure chambers, two of which communicate with one another and are so disposed that the forces produced in them are additive to move the blades in one direction, the third chamber acting only to move the blades in the other direction. If the operative cross-sections of the chambers are chosen appropriately, appropriately different forces can be provided and a very compact actuator devised.

The invention can be clearly understood from the following description, reference being made to the accompanying exemplary non-limitative drawings wherein.

Figure 2:
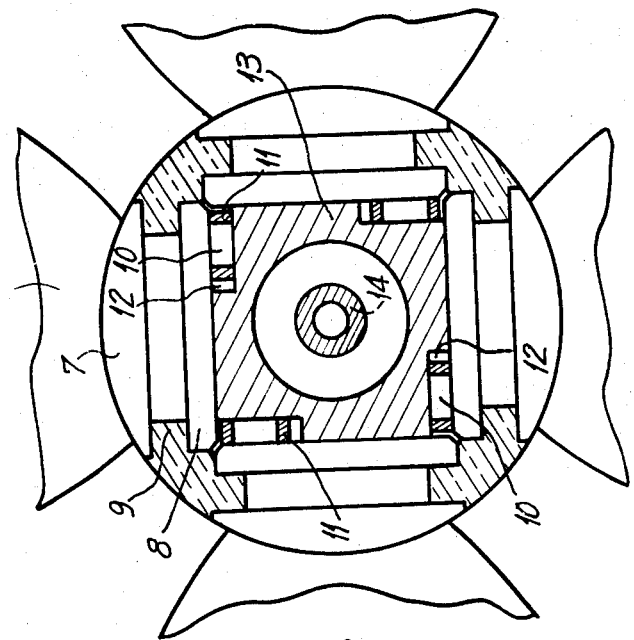
FIG. 2 is a section on the line II—II of FIG. 1.
Figure 1:
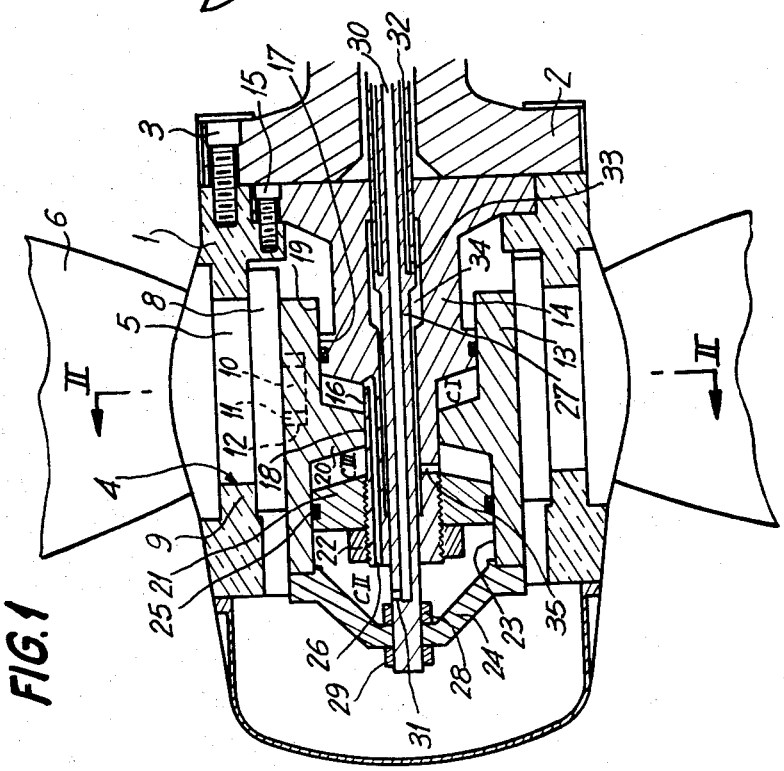
FIG. 1 is a view in axial section of a first embodiment of the invention using an actuator having a stationary piston and a moving cylinder.

In the embodiment shown in FIGS. 1 and 2, a variable-pitch screw comprises a hollow hub 1 connected to a shaft 2 by screws 3 and pierced with circular apertures 4 whose axis is perpendicular to the axis of shaft 2 and which each receive a pivot 5 of a screw blade 6. Blade 6 comprises a disc-like member 7 and the pivot 5 comprises a base 8 which clamp a collar 9 formed by the hub 1, the system formed by the blade and the pivot 5 being adapted to rotate in aperture 4 while bearing on the surfaces of collar 9.

In the hub 1 each of the bases 8 has an eccentric crank pin 10 whose axis is perpendicular to the hub axis. Pin 10 receives a slide block 11 engaged in a groove 12 perpendicular to the axis of the hub and of the pin 10, groove 12 being in the adjacent side surface of cylinder 13 of the actuator serving to orientate the blades (FIG. 2). Cylinder 13, whose outside lateral surface is prismatic at least near the bases 8 can slide therebetween along the axis of hub 1. As it slides it compels the blades to rotate around themselves, the pins 10 and the blocks 11 moving in the respective grooves.

The cylinder 13 is mounted on a central plunger or core 14 coaxial of hub 1 and secured thereto by screws 15 visible in FIG. 1. Plunger 14 has two bearing surfaces 16, 17 which are of different diameters from one another and with which matching bearing surfaces 18, 19 of cylinder 13 are associated. Appropriate sealing means are provided to prevent leakage when the two parts slide relatively to one another. The bearing surfaces 16-19 are respectively joined together by parallel surfaces which bound a first chamber CI of the actuator.

The smallest-diameter bearing surface 16 is associated with the central core or plunger 14 and extends beyond a partition 20 of the cylinder, such partition forming a bearing surface 18, to form the rod of a piston 21 secured to the central core or plunger 14 by screw threading and by a locknut 22. Piston 21 slides in a cylindrical bore 23 which is in cylinder 13 and which is closed by a sealing-tight cover 24. Sealing-tightness in this sliding movement is provided by a seal 25.

Piston 21 bounds two variable-volume chambers C II, CIII in cylinder 13. Chamber C II is on the side near cover 24 and communicates with chamber C I via a passage 26 in the central core or plunger 14. In the present example the diameter of bore 23 is greater than the diameter of bearing surface 19, and so the diameters of chambers C II and CIII are greater than the diameter of chamber C I.

Fluid is supplied to the three chambers, C I, C II, C III through a hollow needle 27 which extends through shaft 2, core or plunger 14 and cover 24, being secured to the latter by nut 28 and backnut 29. Needle 27 has a central passage 30 communicating, via an aperture 31 near nut 28, with chamber C II; needle 27 also has an annular passage 32 which extends around passage 30 and communicates via an aperture 33 with a chamber 34 which is disposed in member 14 and in which the needle 27 slides in sealing-tight conditions in accordance with the movements of cylinder 13. Chamber 34 communicates with chamber C III via a port 35 pierced in member 14 near piston 21.

To move the blades for a changeover from "astern" to "ahead", hydraulic fluid is supplied to chambers C I and C II through the central passage 30, the annular passage 32 discharging. To move the blades in the opposite direction — i.e., to change them over from "ahead" to "astern" — hydraulic fluid is supplied to chamber C III through annular passage 32, the central passage 30 discharging. The force produced in the former case is much greater than the force produced in the second case.

Since needle 27 moves together with actuator cylinder 13, the needle 27 can be used to repeat the position of actuator cylinder 13 to appropriate elements provided on the ship, e.g. to indicate blade position and to control the same.

Figure 4:
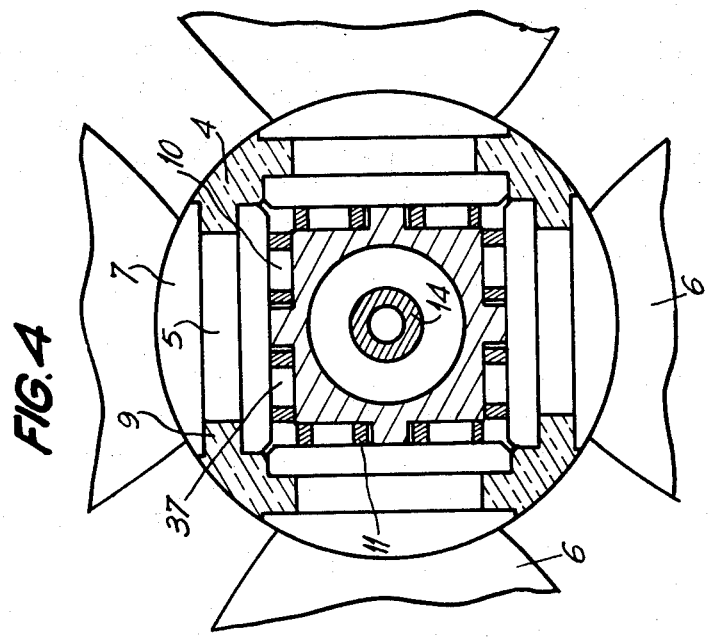
FIG. 4 is a section on the line IV—IV of FIG. 3.
Figure 3:
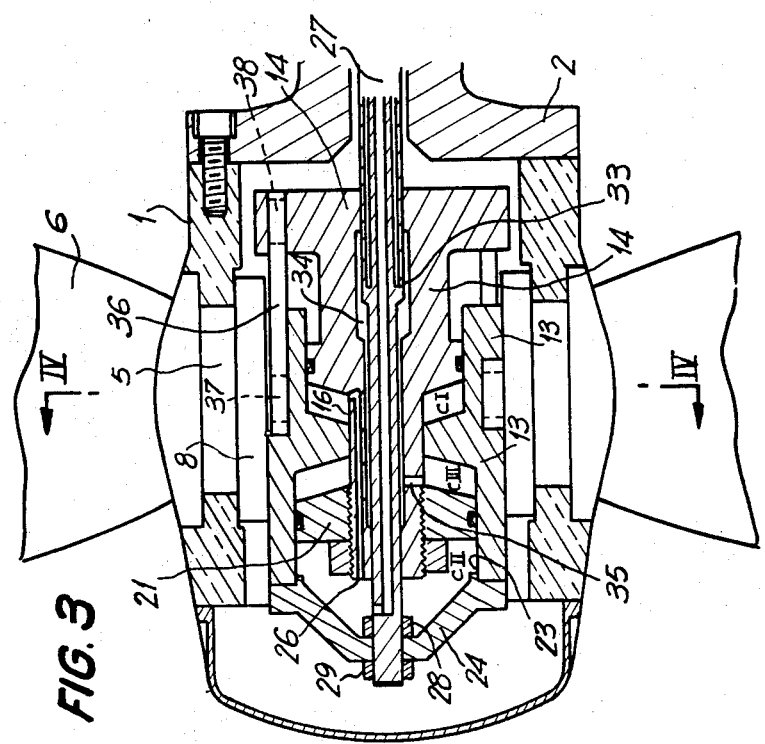
FIG. 3 is a view similar to FIG. 1 but of a variant wherein the actuator cylinder and piston are both moving.

The variant shown in FIGS. 3 and 4 has the same main integers as the embodiment just described, but the central core or plunger 14 is not secured to the hub 1 and slides on needle 27 and in cylinder 13, as well as being connected by rods 36 to crack pins 37 diametrically opposite the pins 10 on the integers 8 of the blades. The rods 36 are pivoted to the central core or plunger 14 at places 38.

The simultaneous movement of the cylinder 13 and plunger 14 when the actuator is energized produces a blade-moving torque. As in the first embodiment, the torque produced by energizing the chambers C I and C II is greater than the force associated with energization of chamber C III.

The invention is of use for all kinds of orientable-blade devices, whatever kind of actuator they use. The invention is particularly useful for marine propulsion screws, as well as being of use for other kinds of screws or rotor, such as the rotors of hydraulic turbines.

Of course, the embodiments just described can be modified, inter alia by the substitution of equivalent technical means, without departure from the scope of this invention.

I claim:

1. A device for controlling the orientation of the blades of a variable-pitch screw apparatus, comprising:
   a rotatable hub and blades mounted for rotation on said hub;
   a cylinder mounted in said hub and to which said blades are operatively connected, said cylinder having an end wall and an intermediate partition forming an inner compartment and an outer bore;
   a central core mounted for reciprocation with respect to said cylinder, passing through said intermediate partition and sealed with respect to said intermediate partition;
   said core being provided with a first piston mounted for reciprocation within said inner compartment and with a second piston mounted for reciprocation within said outer bore, said first piston having a greater area than said second piston;
   means for continuous fluid communication between a first chamber located between said intermediate partition and said second piston, and a second chamber located between said end wall and said first piston,
   and means for selectively feeding a fluid under pressure to one of said first and second chambers, and to a third chamber located between said intermediate partition and said first piston, for developing a greater force in one direction of control of orientation of said blades than in the opposite direction.

2. A device according to claim 1, wherein said feeding means comprises a rod coaxial with said cylinder and secured to said end wall, and on which said core is mounted for reciprocation, said rod having fluid ducts therein.

3. A device according to claim 1, wherein said core is secured to said hub.

4. A device according to claim 1, wherein said core is operatively connected with said blades and is mounted for reciprocation within said hub.

* * * * *